Sept. 2, 1969 R. E. SCHOENEMAN 3,465,349

INCREMENTAL STEPPER FOR TAPE TRANSPORTS

Filed Oct. 22, 1965

INVENTOR

ROBERT E. SCHOENEMAN

BY Lane, Aitken, Dunner & Ziems

ATTORNEYS

United States Patent Office 3,465,349
Patented Sept. 2, 1969

3,465,349
INCREMENTAL STEPPER FOR TAPE TRANSPORTS

Robert E. Schoeneman, Port Washington, N.Y., assignor to Potter Instrument Company, Inc., Plainview, N.Y., a corporation of New York Filed Oct. 22, 1965, Ser. No. 501,962
Int. Cl. G01d 15/06
U.S. Cl. 346—74 9 Claims

ABSTRACT OF THE DISCLOSURE

A high speed incremental tape transport having a magnetically detented incremental motor which rotates its output shaft through a precise predetermined angle each time it is commanded to do so. A control signal is generated by a photoelectric device precisely at the mid point of each incremental step to record each character while the tape is moving and in accurate spaced relation to the preceding character.

Figure 1:
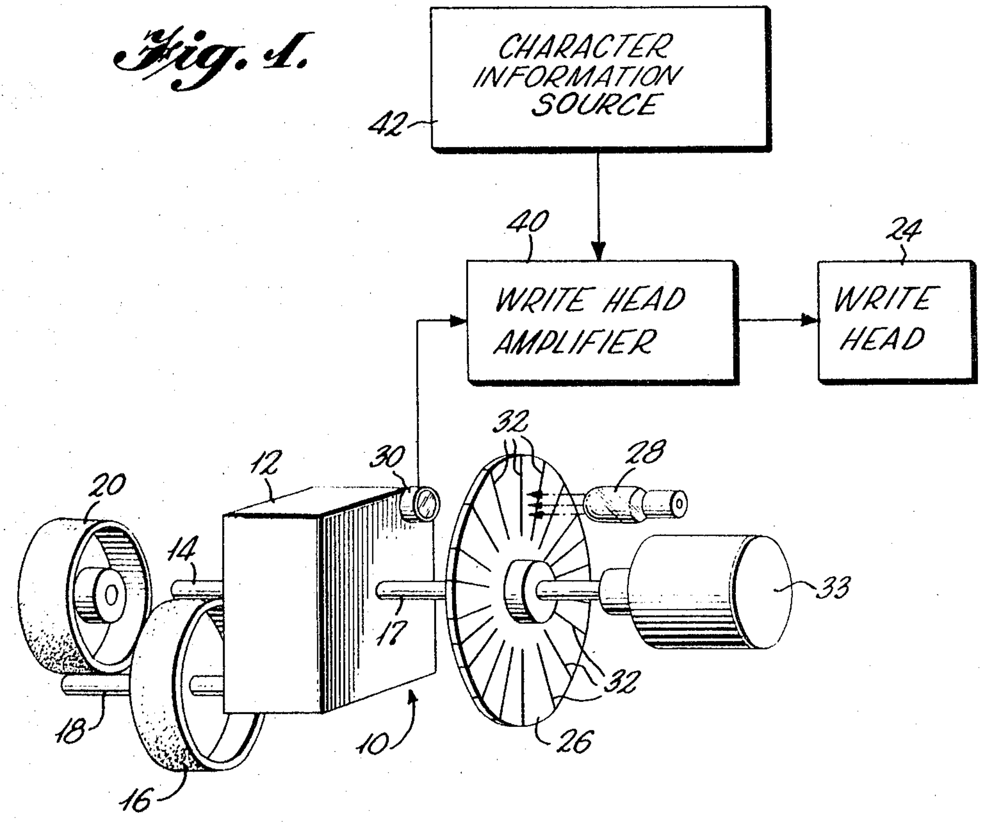

The present invention relates to incremental tape transports, and more particularly to a high speed incremental stepper mechanism for a magnetic tape transport.

One of the most difficult problems encountered in designing an incremental magnetic stepper is to make certain it positions the magnetic tape precisely with respect to a previous character when a new character is written. If, for example, characters are to be written at a packing density of 200 to the inch, it is necessary to write each new character as near as possible to a point .005 inch from the last character written on the tape. In general, it is desirable to maintain a character spacing tolerance of not more than ±10% of the nominal character spacing. For 200 characters per inch, the maximum spread of character-to-character distances to meet this tolerance could be .0045 to .0055.

In accordance with the present invention the accurate character spacing is obtained by generating a control signal at the same predetermined point during each increment of movement of the tape past the recording head. Since the control signal is accurately related to the position of the tape, it can then be used in a number of ways to assure that the next character is written in proper spaced relation to the last character.

In the preferred embodiment of the invention, the control signal is employed to enable the write head amplifiers of the write head to record characters from an information source. The control signal is generated by a photoelectric system responsive to the position of a constant torque motor and drive capstan stepper mechanism which incrementally advances the tape past the write head and, therefore, determines the position of the tape relative to the write head. The photoelectric system briefly comprises a light source and photoelectric detector with a slotted disc positioned therebetween to interrupt the light beam and thus control the energization of the photoelectric detector. The disc in turn is rotated directly by one of the elements of the stepper mechanism and is carefully oriented relative thereto so that the detector produces the control signal at a predetermined point during each step.

Accordingly it is an object of the invention to provide a high speed incremental tape transport having accurate character spacing at high packing densities.

It is another object of the invention to provide an incremental stepper and photoelectric system for producing a control signal responsive to the position of the stepper.

It is a further object of the invention to generate a control signal during each incremental advance of a tape past a write head which control signal is accurately related to the position of the tape relative to the head.

It is a still further object of the invention to provide a tape transport with improved character spacing by writing each new character on the tape while it is being advanced through an increment and in a predetermined portion of each increment.

It is a still further object of the invention to provide a reliable, high speed incremental stepper for a tape transport with accurate character spacing.

Figure 2:
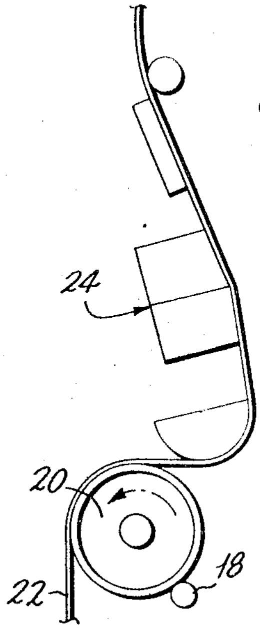

Other objects and features of novelty of the present invention will be specifically pointed out or will otherwise become apparent when referring, for a better understanding of the invention, to the following description taken in conjunction with the accompanying drawings, wherein:

FIG. 1 is a schematic view of an incremental stepper illustrating one embodiment of the invention; and FIG. 2 is a fragmentary schematic view illustrating tape being drawn past a write head by the incremental stepper of FIG. 1.

Referring to FIG. 1, an incremental stepper 10 is shown which illustrates one embodiment of the invention. The incremental stepper 10 briefly comprises a motor 12 having two output shafts 14 and 17. The output shaft 14 is connected directly to an idler 16 having an output shaft 18 connected directly to a drive capstan 20 to rotate the drive capstan at a reduced speed. In the preferred embodiment illustrated, a reduction ratio of 50 to 1 is provided so that the motor output shaft 14 rotates 50 times for each revolution of the drive capstan 20. As illustrated in FIG. 2, the drive capstan 20 drives a magnetic tape 22 past a write head 24 of a magnetic tape transport in a conventional manner.

A number of different types of motors can be employed for driving the capstan 20. However, in the preferred embodiment illustrated, the motor 12 is a constant torque, magnetically detented incremental motor of the type described in the patent to Fisher No. 2,834,896 issued on May 13, 1958. One of the primary characteristics of this type of motor is its ability to rotate the output shafts 14 and 17 precisely 18° when commanded to do so. Twenty commands, therefore, will cause the motor to rotate step by step through 360°, or one full revolution. It is apparent that the aforementioned 50 to 1 speed reduction ratio causes the capstan to rotate through 0.36° increments which is 1/1000 of a revolution of the capstan per 18° revolution of the motor output shaft. In the preferred embodiment illustrated, the circumference of the capstan is five inches so that each 1/1000 of a revolution of the capstan produces a 0.005 inch incremental movement of the tape each time the motor is commanded to rotate through 18°. As mentioned above, if the characters are to be written on the tape at a packing density of 200 to the inch, a 0.005 inch increment with a tolerance of not more than ±10% is necessary in order to write a new character as near as possible to a point 0.005 inch from the last character written on the tape.

In order to provide accurate information as to the exact position of the tape 22 relative to the write head 24, a slotted disc 26 is connected to the motor output shaft 17 for rotation therewith to interrupt or chop a light beam emanating from a suitable light source 28 and acting on a photoelectric detector 30 mounted on the motor housing 12. With this arrangement, the light beam energizes the detector 30 to produce a control signal each time one of the slots 32 of the slotted disc 26 is aligned therewith. Since the motor 12 steps through 20 steps per revolution, the disc 26 is provided with twenty equally spaced slots (18° between slots) and the disc is preferably oriented so that a slot is detected by the photoelectric detector 30 during the middle portion of an 18° incremental movement of the motor output shaft. By locating the disc 26 on the motor output shaft 17 rather than on the drive capstan shaft, for example, fewer slots are needed and the slots can be spaced the maximum distance apart.

The control signal produced by the photoelectric detector 30 is applied to a write head amplifier 40 to enable the amplifier to transmit the input character from an information source 42 to the write head 24 to cause the input character to be written on the tape 22. With this arrangement, each new input character is written on the tape precisely .005 inches from the previous character to provide the highest possible spacing accuracy between the characters.

Although the magnetically detented incremental motor has many desirable performance characteristics relative to a continuously energized motor which is latched and unlatched by a suitable brake mechanism to produce the incremental stepping operation, it has an undesirable performance characteristic in that the output shafts have a tendency to oscillate about a detent point following a step. Although a damper 33 is provided on the shaft, these oscillations are still rather large and produce similar oscillations of the tape at the write head. If the oscillation period were short enough so that all the tape drive components and the tape itself were at full rest before the next step was commanded, there would be no difficulty in writing accurately spaced characters. The oscillation period, however, sometimes exceeds a point in time 5.5 milliseconds from the step command that caused it. The incremental stepper 10 of the preferred embodiment illustrated is designed to produce a minimum of 300 steps per second. This corresponds to a period of 3.3 milliseconds, and it is apparent that the input character might be recorded on the tape while the tape is oscillating due to the tendency of the motor output shaft to oscillate about a detent point. If the tape is in motion (oscillating) at the time the character is written, there is no way of knowing where the character will be located on the tape with respect to the previously written character. Only if the tape is still will the character be written exactly .005 inch from the point where it had been before the step was commanded.

The present invention completely overcomes the problem by recording each input character during an incremental movement and before the oscillations occur at the end of the step. It has been found that the tape oscillations following an increment usually do not exceed ±25% of the total increment. Therefore, the middle 50% of the tape increment never returns to the write head gap. Stated otherwise, during the middle one-half of the tape increment, a point on the tape passes the write head gap only once but during the last one-fourth of an increment a point on the tape may return to or pass through the write head gap more than once due to the oscillations. Therefore it is highly preferable to write each input character on the tape during the middle half of a tape increment (corresponding to 4½–13½° portion of the 18° movement of the motor output shaft 14), and in the preferred embodiment illustrated, the slotted disc 26 is oriented to cause the photoelectric detector 30 to produce the control signal between the first and third fourths of a tape increment and as near as possible to the mid-point of a tape increment (which corresponds to 9° of rotation of the motor output shaft).

In view of the foregoing it will be apparent that the embodiment of the invention herein disclosed is well calculated to fulfill the objects of the invention.

What is claimed is:

1. A tape transport comprising a write head, drive means responsive to step command signals for incrementally stepping a tape past said write head, said drive means rotating through a precise predetermined angle each time it receives a step command signal and automatically stopping at a stop point at the end of said angle, said stop points being equally spaced from one another and traversed by said drive means in repeating cycles, said drive means oscillating briefly about said stop points before coming to a complete stop so that spaced portions of said tape pass said write head more than once and the remaining portions of the tape pass said write head only once, signal means directly responsive to the position of said drive means for generating a control signal while said tape is moving and at a predetermined point in each of said remaining portions, and means controlled by said control signal for instantaneously transmitting an input character to said write head at the time of generation of said control signal and each time said control signal is generated to record said input character at said predetermined point on the one of said remaining portions being traversed at the time said control signal is generated whereby said input characters are spaced accurately relative to one another and relative to the beginning and end of each step.

2. The tape transport as defined in claim 1 wherein said drive means incrementally advances said tape a minimum of three hundred steps per second.

3. The tape transport as defined in claim 1 wherein said signal means comprises photoelectric detector means, means for directing a light beam on said photoelectric detector means, and means drivingly connected to said drive means for chopping said light beam.

4. The tape transport as defined in claim 1 wherein said control signal is generated during the second quarter of each step.

5. The tape transport as defined in claim 4 wherein said control signal is generated at the end of the second quarter of each step, and said drive means incrementally advances said tape a minimum of 300 steps per second and through increments which produce a packing density of about two hundred characters per inch of tape.

6. The tape transport as defined in claim 1 wherein said drive means comprises a magnetically detented incremental stepping motor which rotates its output shaft through a precise predetermined angle each time it is commanded to do so, a capstan, and speed reducing means drivingly connecting said motor to said capstan, and wherein said signal means is drivingly connected to the output shaft of said motor.

7. The transport as defined in claim 6 wherein said signal means generates said control signal at the mid point of each of said incremental steps.

8. The tape transport as defined in claim 6 wherein said control signal generating means comprises photoelectric detector means, means for directing a light beam on said photoelectric detector means, and means drivingly connected to the output shaft of said motor for chopping said light beam.

9. The tape transport as defined in claim 6 wherein said motor, said speed reducing means, said slotted disc and said drive capstan co-operate to produce a character spacing of .005 inches on said tape.

References Cited

UNITED STATES PATENTS

| | | | |
|---|---|---|---|
| 2,931,689 | 5/1960 | Dupy | 346—74 |
| 3,275,208 | 9/1966 | Poumakis | 340—174.1 |
| 3,332,084 | 7/1967 | Wahrer | 340—174.1 |
| 3,357,002 | 12/1967 | Smith-Vaniz | 340—174.1 |

BERNARD KONICK, Primary Examiner

LEE J. SCHROEDER, Assistant Examiner

U.S. Cl. X.R.

340—174.1